Aug. 23, 1927.
C. C. TRESTER
1,640,163
CRANK
Filed Feb. 26, 1927
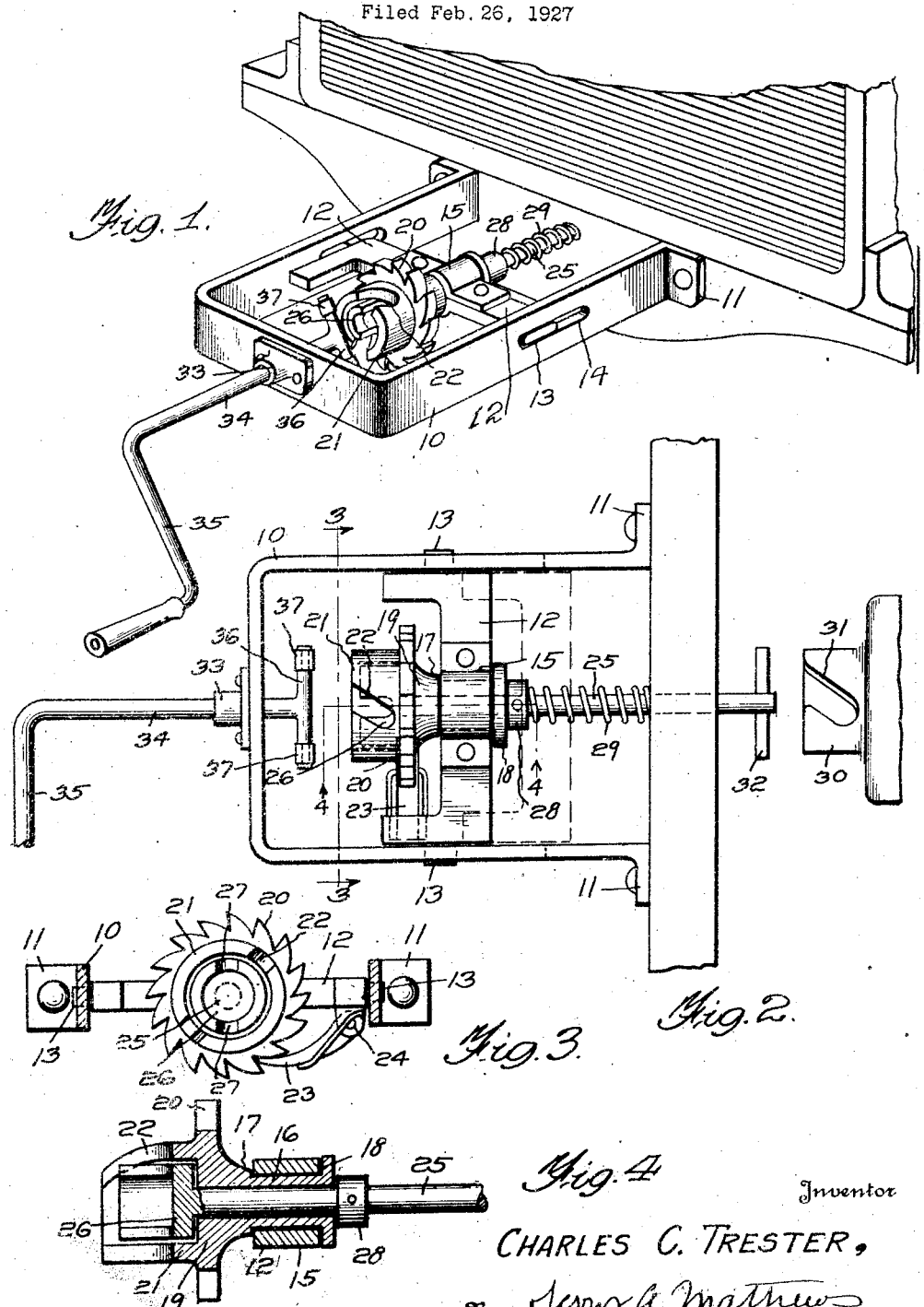
Inventor
CHARLES C. TRESTER,
By Jerry A. Mathews
Attorney Patented Aug. 23, 1927.

1,640,163

UNITED STATES PATENT OFFICE.

CHARLES C. TRESTER, OF LAWRENCEBURG, INDIANA.

CRANK.

Application filed February 26, 1927. Serial No. 171,190.

My invention relates to a manually operated device for cranking internal combustion engines.

An important object of my invention is to provide a device of the above mentioned character, which will automatically release itself from connection with the crank shaft of an engine, should the engine backfire.

A further object of the invention is to provide a device of the above mentioned character having means to release the same from connection with the crank shaft when the engine starts up.

A further object of the invention is to provide a device of the above mentioned character which is simple in construction, durable and strong.

Other objects and advantages of the invention will be apparent during the course of the following description.

In the accompanying drawings forming a part of this specification and in which like numerals are employed to designate like parts throughout the same, Figure 1 is a perspective view of a device embodying my invention, Figure 2 is a plan view of the same, Figure 3 is a transverse section taken on line 3—3 of Figure 2, and, Figure 4 is a longitudinal section taken on line 4—4 of Figure 2.

In the drawings, wherein for the purpose of illustration, is shown a preferred embodiment of my invention, the numeral 10 designates a U-shaped supporting frame, provided at its rear ends with ears 11, which are bolted or otherwise rigidly attached to the front transverse end of the chassis.

Mounted to slide longitudinally within the frame 10 is a carriage 12, provided at its ends with extensions 13, slidable within elongated slots 14. This carriage is equipped centrally thereof with a bearing 15.

Rotatable within this bearing is a sleeve 16, held against longitudinal movement therein by shoulders 17 and 18. This sleeve carries at its forward end a head 19, provided upon its periphery with ratchet teeth 20. The head 19 is preferably formed integral with the sleeve and this head is provided upon its forward face with a tubular clutch element 21, preferably formed integral therewith. This tubular clutch element is provided with inclined slots 22, preferably arranged diametrically opposite each other. The walls of these slots are inclined, as shown. Arranged upon one side of the ratchet teeth 20 to engage therewith is a spring pressed pawl 23, pivoted to the carriage 12, at 24. The pawl and ratchet arrangement is such that the head 19 is free to be turned in the direction to crank the engine, but is locked against reverse turning movement.

Rotatable within the sleeve 16 is a connecting shaft 25, carrying at its forward end a tubular clutch element 26, rigidly secured thereto, and this tubular clutch element is provided with a pair of diametrically oppositely arranged slots 27, adapted to be brought into registration with the forward ends of the inclined slots 22.

The numeral 28 designates a collar, mounted upon the shaft 25, at the rear of the sleeve 16, and rigidly attached to the shaft 25. It is thus seen that the shaft 25 is free to rotate within the sleeve 16 but can not move longitudinally therein. The shaft 25 is normally retained in the forward position by means of a compressible coil spring 29, surrounding the same, and engaging the ring 28 and the transverse beam of the chassis. The rear end of the connecting shaft 25 extends into proximity to a tubular clutch element 30, rigidly mounted upon the crank shaft of the engine. This tubular clutch element is equipped with inclined slots 31 to receive a transverse clutch element or pin 32, rigidly attached to the rear end of the shaft 25.

The frame 10 carries at its forward end a bearing 33 in which is slidably mounted a shaft 34, carrying an end crank 35. The shaft extends rearwardly into the forward end of the frame 10 and is provided at its rear end with a transverse clutch element or pin 36, preferably equipped with rollers 37. This transverse clutch element is adapted for movement into the slots 22 and 27, the rollers 37 engaging the walls of the slots 22.

The operation of the device is as follows:

With the parts in the position shown in Figure 2, to crank the engine, the shaft 34 is moved rearwardly and the rollers 37 may contact with the forward end of the tubular clutch element 21. Further rearward movement of the shaft 34 will bring the clutch element 32 into contact with the forward end of the clutch element 30. Rearward pressure is maintained upon the shaft 34 while it is turned, and the rollers 37 first enter the inclined slots 22, and if the slots 27 are not in alinement with the outer ends of the slots 22, the sleeve 16 will turn with relation to the shaft 25, until such alinement occurs, at which time the traverse clutch element 36 will enter the slots 27. The sleeve 16 and shaft 25 are now locked for turning movement, and if the clutch element 32 has not as yet entered the inclined slots 31, the turning movement of the shaft 25 will bring the clutch element 32 into the slots 31. The shaft 25 is now locked to the clutch element 30, for turning movement in a direction to crank the engine. The crank 35 is now turned in a direction to crank the engine. When the engine starts up, the slots 31 are inclined in the direction to automatically shift the shaft 25 forwardly, which will in turn shift the carriage forwardly. Should the engine backfire, the shaft 25 will be turned counter-clockwise while the tubular clutch element 21 is held against rotation by the pawl and ratchet means. The transverse clutch element is now in the slots 27 and the rollers engage the inclined walls of the slots 22. Hence the shaft 25 will tend to turn the shaft 34 counter-clockwise, but the rollers 37 will travel outwardly of the inclined slots 22 and disengage the walls of the slots 27. The disengagement is rendered certain by having the clutch element 21 substantially longer than the clutch element 26, to project forwardly beyond the same.

It is to be understood that the form of my invention, herewith shown and described, is to be taken as a preferred example of the same, and that various changes in the shape, size and arrangement of parts may be resorted to without departing from the spirit of my invention, or the scope of the subjoined claims.

Having thus described my invention, I claim:—

1. An engine cranking device comprising, a rotatable shaft, a tubular clutch element mounted upon the shaft and provided with longitudinal slots extending substantially parallel with the longitudinal axis of the tubular clutch element, a second tubular clutch element rotatably mounted upon the shaft and receiving the first named tubular clutch element therein and projecting forwardly beyond the same, said tubular clutch elements being incapable of partaking of substantial relative longitudinal movements, the second tubular clutch element having inclined longitudinal slots, and a shaft having a transverse clutch element adapted to enter the slots of the first and second named tubular clutch elements, and pawl and ratchet means for preventing the rotation of the second named tubular clutch element in one direction.

2. An engine cranking device comprising, a support, a rotatable shaft carried thereby, a tubular clutch element connected with the shaft to turn it, said tubular clutch element having longitudinal slots which extend substantially parallel with the longitudinal axis of the tubular clutch element, a second tubular clutch element surrounding the first named tubular clutch element and rotatable upon said shaft and incapable of partaking of substantial longitudinal movements with relation to the first named tubular clutch element, said second tubular clutch element having longitudinal slots which are inclined, pawl and ratchet means to prevent the rotation of the second named tubular clutch element in one direction, a shaft slidably mounted upon said support to move longitudinally with relation to the tubular clutch elements, and a transverse pin carried by said shaft and adapted for insertion within the slots of the first and second named tubular clutch elements.

3. An engine cranking device comprising, a support, a rotatable shaft carried thereby, a tubular clutch element connected with the shaft to turn it and having longitudinal slots, a second tubular clutch element of larger diameter rotatably mounted upon the shaft and receiving therein the first named tubular clutch element and having inclined slots, a transverse clutch element for insertion within the slots of the first and second named tubular clutch elements and carrying rollers to engage the walls of the inclined slots, and a crank shaft carried by the support and connected with the transverse clutch element.

4. An engine cranking device comprising, a frame, a carriage mounted upon the frame to move longitudinally thereof, a sleeve rotatably mounted upon the carriage and provided at its forward end with a tubular clutch element having inclined slots, a ratchet wheel connected with the tubular clutch head, a pawl pivoted upon the frame and engaging the ratchet wheel, a shaft rotatable within the sleeve and provided at its rear end with a clutch element, a spring to move the shaft forwardly, a tubular clutch element mounted within the first named tubular clutch element and having longitudinal slots and attached to said shaft, a shaft slidably mounted upon the frame, and a transverse clutch element secured to the shaft and adapted for insertion within the slots of the first and second named tubular clutch elements, and rollers carried by the transverse clutch element to engage with the walls of the inclined slots.

In testimony whereof I affix my signature.

CHARLES C. TRESTER.